US011430583B2

(12) United States Patent
Eshima et al.

(10) Patent No.: US 11,430,583 B2
(45) Date of Patent: Aug. 30, 2022

(54) WIRE HARNESS WITH INSULATED TWISTED WIRE AND WELDED HOLDING MEMBER

(71) Applicant: HITACHI METALS, LTD., Tokyo (JP)

(72) Inventors: Hirotaka Eshima, Tokyo (JP); Takahiro Futatsumori, Tokyo (JP); Shingo Hatayama, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/940,478

(22) Filed: Jul. 28, 2020

(65) Prior Publication Data

US 2021/0035709 A1  Feb. 4, 2021

(30) Foreign Application Priority Data

Jul. 29, 2019  (JP) .............................. JP2019-138882

(51) Int. Cl.
| | | |
|---|---|---|
| *H01B 7/40* | (2006.01) | |
| *H02G 3/22* | (2006.01) | |
| *H02G 3/32* | (2006.01) | |
| *H01B 7/18* | (2006.01) | |
| *H01B 7/00* | (2006.01) | |
| *H01B 17/58* | (2006.01) | |

(52) U.S. Cl.
CPC ......... *H01B 7/1875* (2013.01); *H01B 7/0045* (2013.01); *H01B 7/187* (2013.01); *H01B 7/40* (2013.01); *H01B 17/583* (2013.01); *H01B 7/0009* (2013.01); *H02G 3/22* (2013.01); *H02G 3/32* (2013.01)

(58) Field of Classification Search
CPC .. H02G 3/30; H02G 3/22; H02G 3/04; H02G 3/32; H01B 7/00; H01B 7/18; H01B 7/40; H01B 7/1875; H01B 7/0045; H01B 7/187; H01B 17/583; H01B 7/0009
USPC .......................................................... 174/480
See application file for complete search history.

(56) References Cited

U.S. PATENT DOCUMENTS

| | | | | |
|---|---|---|---|---|
| 3,675,184 | A * | 7/1972 | Vetter ..................... | H01R 13/59 439/462 |
| 3,911,201 | A * | 10/1975 | Fry ....................... | H01B 7/0045 174/72 A |
| 6,957,970 | B2 * | 10/2005 | Weigel ............... | H01R 13/5219 439/604 |
| 7,348,491 | B2 * | 3/2008 | Fuller ................ | B60R 16/0222 174/152 G |
| 7,896,687 | B1 * | 3/2011 | Schweitzer ........ | H01R 13/5804 439/457 |

(Continued)

FOREIGN PATENT DOCUMENTS

JP  2013237428 A  11/2013

*Primary Examiner* — Timothy J Thompson
*Assistant Examiner* — Michael F McAllister
(74) *Attorney, Agent, or Firm* — Meunier Carlin & Curfman LLC

(57) ABSTRACT

A wire harness includes a cable and a holding member. The cable includes a twisted wire, and an insulation coating that coats the twisted wire. The cable has a bent portion. The holding member covers a range of the cable including the bent portion, and retains a shape of the bent portion. The twisted wire is in contact with the holding member at least in a part of the bent portion.

4 Claims, 6 Drawing Sheets

(56) References Cited

U.S. PATENT DOCUMENTS

| | | | |
|---|---|---|---|
| 8,624,115 B2* | 1/2014 | Mabuchi | B60R 16/0215 174/72 A |
| 2012/0125683 A1* | 5/2012 | Mabuchi | B60R 16/0215 174/72 A |
| 2013/0277087 A1 | 10/2013 | Hayakawa et al. | |
| 2014/0353029 A1* | 12/2014 | Tsubouchi | H01B 11/06 174/72 A |
| 2015/0165987 A1 | 6/2015 | Hayakawa et al. | |
| 2015/0165988 A1 | 6/2015 | Hayakawa et al. | |
| 2016/0339854 A1 | 11/2016 | Hayakawa et al. | |
| 2016/0343471 A1* | 11/2016 | Ernst | H01B 13/228 |
| 2017/0179703 A1* | 6/2017 | Kominato | H01B 7/0045 |
| 2018/0134239 A1 | 5/2018 | Hayakawa et al. | |
| 2019/0210543 A1 | 7/2019 | Hayakawa et al. | |
| 2021/0296023 A1* | 9/2021 | Nakao | H01B 7/17 |

\* cited by examiner

WIRE HARNESS WITH INSULATED TWISTED WIRE AND WELDED HOLDING MEMBER

CROSS-REFERENCE TO RELATED APPLICATIONS

This application claims the benefit of Japanese Patent Application No. 2019-138882 filed on Jul. 29, 2019 with the Japan Patent Office, the entire disclosure of which is incorporated herein by reference.

BACKGROUND

The present disclosure relates to a wire harness.

Japanese Unexamined Patent Application Publication No. 2013-237428 discloses a wire harness for a vehicle. The wire harness is routed along a specified path.

SUMMARY

A path of a wire harness often has a bent section. If a portion of the wire harness to be routed in the bent section has a bent shape in advance, an operation to route the wire harness is facilitated. One aspect of the present disclosure is to provide a wire harness that can retain a bent shape.

A wire harness in one aspect of the present disclosure comprises a cable and a holding member. The cable comprises a twisted wire, and an insulation coating that coats the twisted wire. The cable has a bent portion. The holding member covers a range of the cable including the bent portion, and retains a shape of the bent portion. The twisted wire is in contact with the holding member at least in a part of the bent portion.

Since the wire harness in one aspect of the present disclosure comprises the holding member, the bent portion of the cable can retain its shape. Use of the wire harness in one aspect of the present disclosure facilitates routing operation.

BRIEF DESCRIPTION OF THE DRAWINGS

Exemplary embodiments of the present disclosure will be described hereinafter with reference to the accompanying drawings, in which.

DETAILED DESCRIPTION OF EXEMPLARY EMBODIMENTS

First Embodiment

1. Structure of Wire Harness 1

Figure 1:
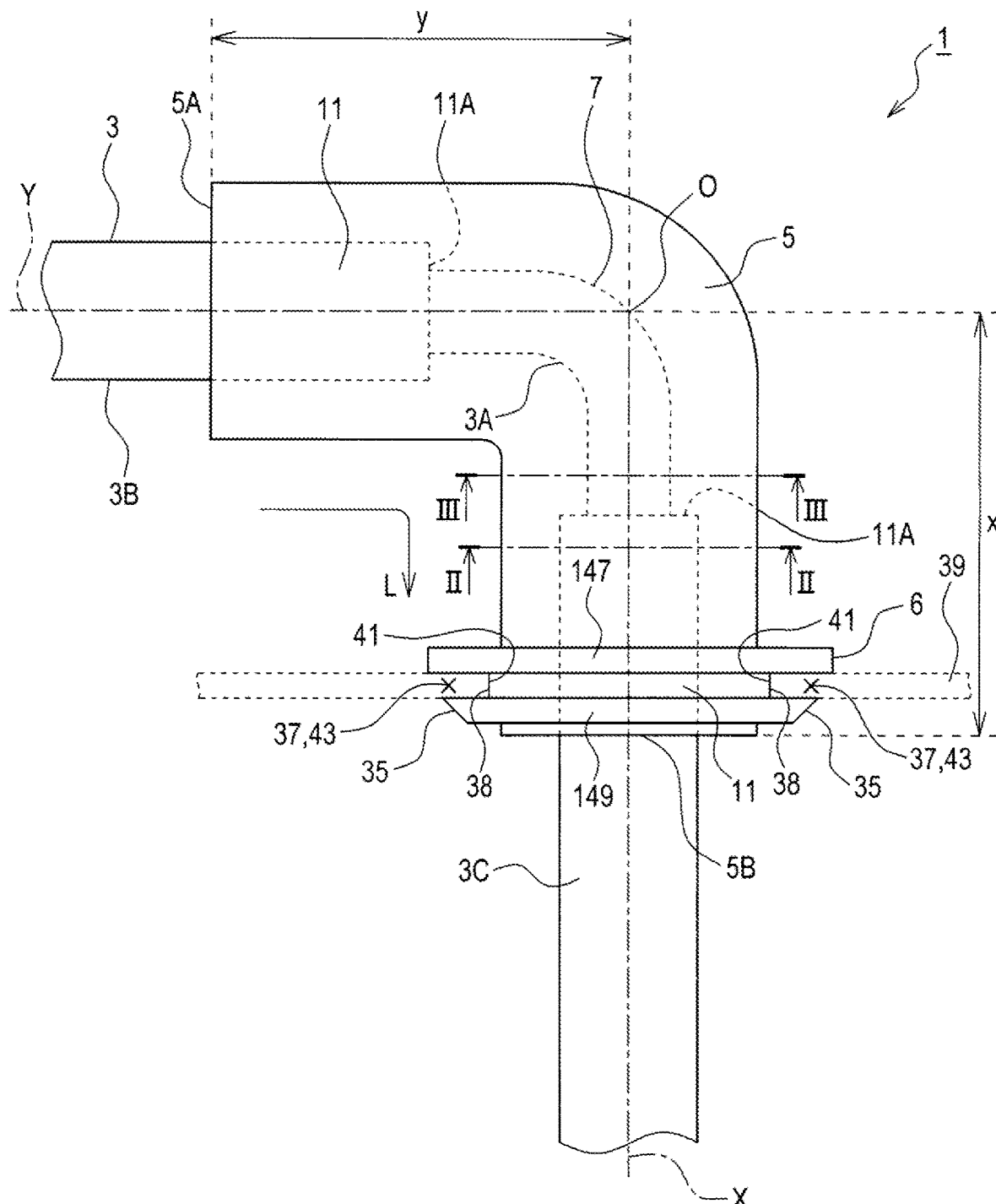
FIG. 1 is a plan view showing a structure of a wire harness 1 in a first embodiment.

Configuration of a wire harness 1 will be described with reference to FIGS. 1 to 4. The wire harness 1 is used, for example, in a vehicle such as an automobile and a railroad vehicle. As shown in FIG. 1, the wire harness 1 comprises a cable 3, a holding member 5, and a grommet 6.

As shown in FIG. 1, the cable 3 has a bent portion 3A having a bent shape, and straight portions 3B, 3C each having a straight-line shape. The bent portion 3A and the straight portions 3B, 3C are arranged in the order of the straight portion 3B, the bent portion 3A, and the straight portion 3C along a longitudinal direction L of the cable 3. The bent portion 3A may have an acute, right, or obtuse bending angle.

Figure 2:
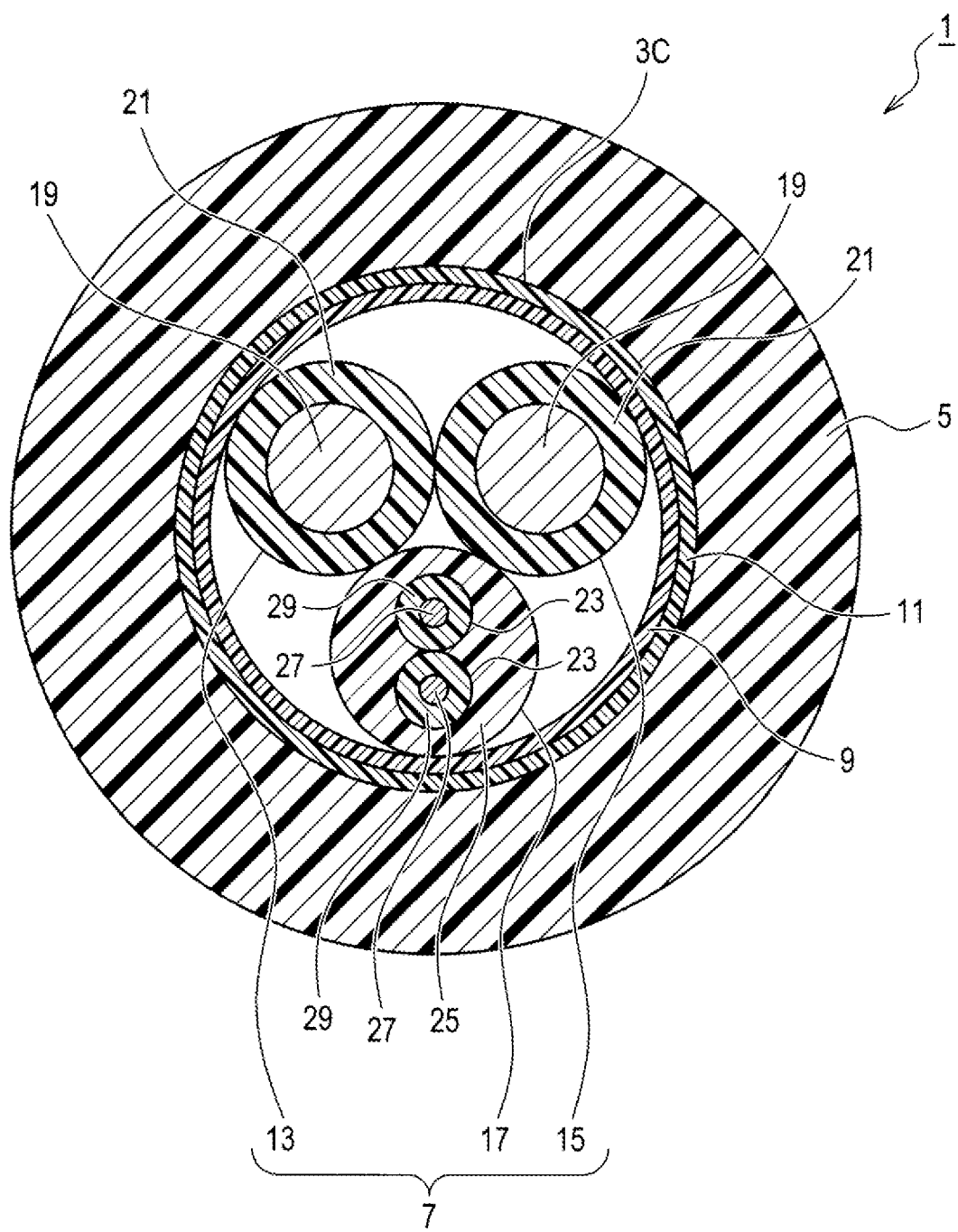
FIG. 2 is a sectional view taken along a section II-II in FIG. 1.

The straight portions 3B, 3C have the same configuration. FIG. 2 is a II-II sectional view at the straight portion 3C. The straight portions 3B, 3C each comprise a twisted wire 7, a tape 9, and an outer sheath 11. The outer sheath 11 corresponds to an insulation coating.

The twisted wire 7 is formed by twisting electric wires 13, 15, 17. The electric wire 13 comprises a core wire 19 and an insulation layer 21. The insulation layer 21 covers an outer peripheral surface of the core wire 19. The electric wire 15 has the same configuration as the electric wire 13. The electric wires 13, 15 are, for example, power lines for an electric brake or for an electric parking brake.

The electric wire 17 comprises two electric wires 23 and an inner sheath 25. The two electric wires 23 are twisted. The electric wires 23 each comprise a core wire 27 and an insulation layer 29. The insulation layer 29 covers an outer peripheral surface of the core wire 27. The inner sheath 25 covers the two electric wires 23. The electric wire 17 is, for example, a signal line for an ABS sensor.

The tape 9 is wrapped around an outer circumference of the twisted wire 7. The outer sheath 11 is provided further on the outer circumference side of the tape 9. The outer sheath 11 may be made, for example, of thermoplastic resin, rubber, and the like. Examples of thermoplastic resin include thermoplastic urethane, etc. Examples of rubber include ethylene propylene diene rubber (EPDM). Thermoplastic resin and rubber may or may not be cross-linked. It is preferable that the outer sheath 11 has a thickness of 0.3 mm or more and 3.0 mm or less.

Figure 3:
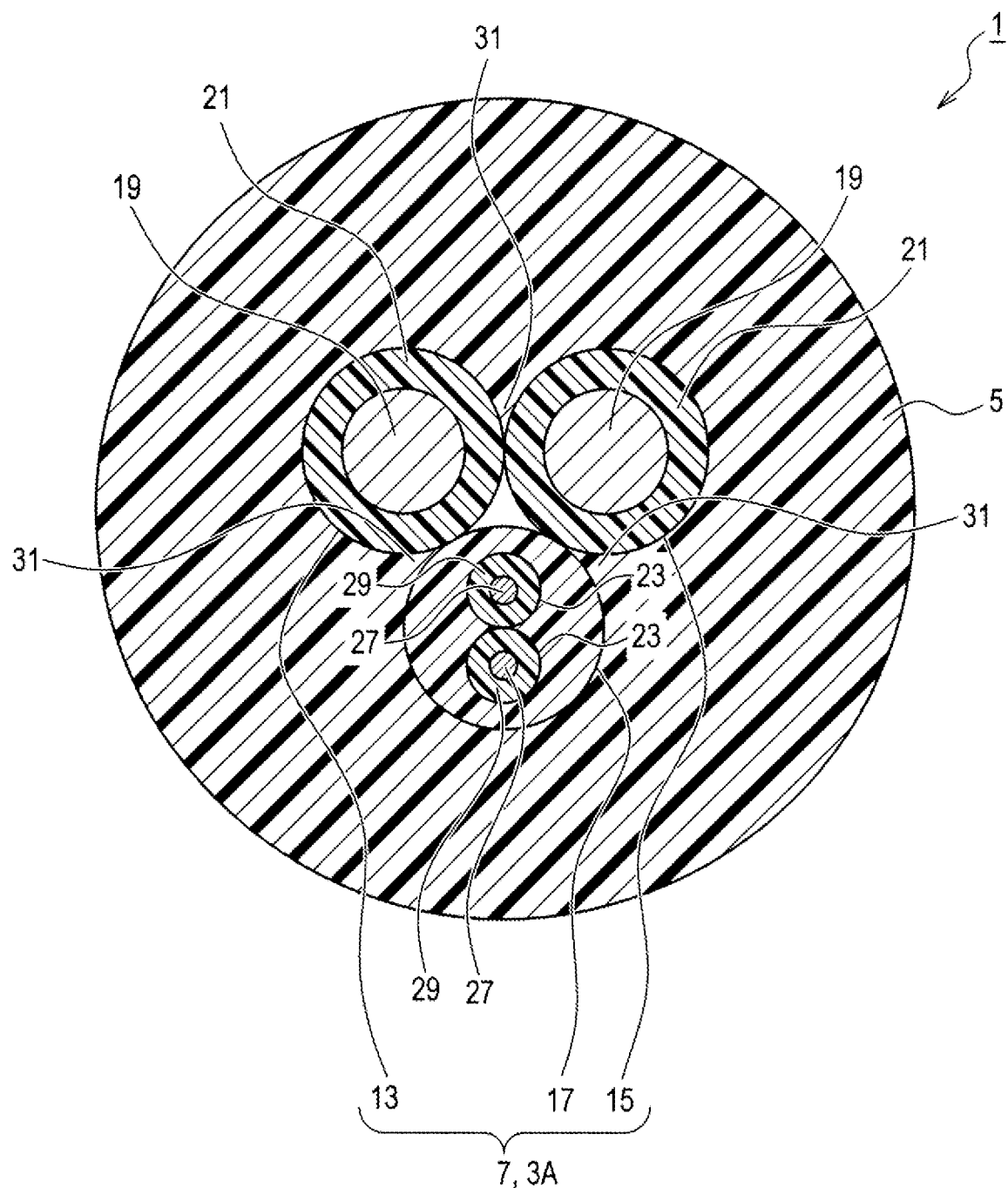
FIG. 3 is a sectional view taken along a section III-III in FIG. 1.

As shown in FIG. 3, the bent portion 3A is different from the straight portions 3B, 3C in that the bent portion 3A does not comprise the tape 9 and the outer sheath 11. The bent portion 3A, like the straight portions 3B, 3C, comprises the twisted wire 7.

As shown in FIG. 1, the holding member 5 covers the whole bent portion 3A, a part of the straight portion 3B, and a part of the straight portion 3C. The holding member 5 allows the bent portion 3A to retain a certain shape without an external force applied on the cable 3.

As shown in FIG. 2, the holding member 5 is in contact with the outer sheath 11 of the straight portion 3C. The holding member 5 is also in contact with the outer sheath 11 of the straight portion 3B. The holding member 5 is welded to the outer sheaths 11 of the straight portions 3B, 3C. Each of ends 5A, 5B of the holding member 5 in the longitudinal direction L is welded to the corresponding outer sheath 11.

As shown in FIG. 3, the holding member 5 is in contact with the twisted wire 7 in the bent portion 3A. The holding member 5 enters gaps 31 between the electric wires 13, 15, 17.

The holding member 5 may be made, for example, of the same material as the outer sheath 11. It is preferable that the holding member 5 is made of the same material as the outer sheath 11. When the holding member 5 is made of the same material as the outer sheath 11, it is easy to weld the holding member 5 and the outer sheath 11.

It is preferable that the holding member 5 that covers the bent portion 3A and the straight portions 3B, 3C has a thickness of 1.0 mm or more and 15.0 mm or less. When the holding member 5 that covers the bent portion 3A and the straight portions 3B, 3C has a thickness of 1.0 mm or more, the bent portion 3A can have a more stable shape. When the holding member 5 that covers the bent portion 3A and the straight portions 3B, 3C has a thickness of 15.0 mm or less, downsizing of the holding member 5 can be achieved.

An outer peripheral surface of the holding member 5 on a section orthogonal to the longitudinal direction L has a circular shape, for example, as shown in FIGS. 2 and 3. The outer peripheral surface of the holding member 5 may have, for example, an oval shape, an elliptical shape, a rectangular shape or the like.

As shown in FIG. 1, a portion of the holding member 5 that covers the bent portion 3A is curved along the shape of the bent portion 3A. Assume a virtual straight line X that passes through the center of the straight portion 3C, and that is parallel to an axial direction of the straight portion 3C. Also, assume a virtual straight line Y that passes through the center of the straight portion 3B, and that is parallel to an axial direction of the straight portion 3B. Let O be an intersection between the virtual straight line X and the virtual straight line Y. Let x be a distance from the intersection O to an end face of the holding member 5 on the end 5B side. Let y be a distance from the intersection O to an end face of the holding member 5 on the end 5A side.

The distance x and the distance y are approximately the same, for example. It is preferable that the distance y is smaller than the distance x for a reason explained below. A portion of the holding member 5 on the end 5A side of the intersection O is far from a position where the holding member 5 is fixed to a later-described fixing target 53 by a fixing member 45, and is easy to vibrate. When the distance y is small, the portion of the holding member 5 on the end 5A side of the intersection O is small. Thus, vibration of the holding member 5 can be reduced. As a result, damages to the holding member 5 can be inhibited, and life of the holding member 5 can be extended.

As shown in FIG. 1, the grommet 6 is provided on the outer circumference side of the holding member 5. The outer circumference side is a side away from the central axis of the cable 3, which is covered with the holding member 5, along a radial direction of the cable 3. The inner circumference side is a side opposite from the outer circumference side. The grommet 6 may be a member integrated with the holding member 5, or may be a member separate from the holding member 5. The grommet 6 is located on the end 5B side in the longitudinal direction L.

The grommet 6 substantially has a flange shape extending further in an outer circumferential direction from the outer peripheral surface of the holding member 5. The grommet 6 comprises a first protrusion 147, a second protrusion 149, and a groove 37. The first protrusion 147 is located on the intersection O side of the groove 37. The second protrusion 149 is located on the end 5B side of the groove 37. Both the first protrusion 147 and the second protrusion 149 extend farther in the outer circumferential direction of the holding member 5 than the groove 37. The second protrusion 149 has a smaller outer diameter than the first protrusion 147. The second protrusion 149 has a tapered outer circumferential edge 35, which means that the outer diameter of the outer circumferential edge 35 becomes smaller toward the end 5B.

Figure 4:
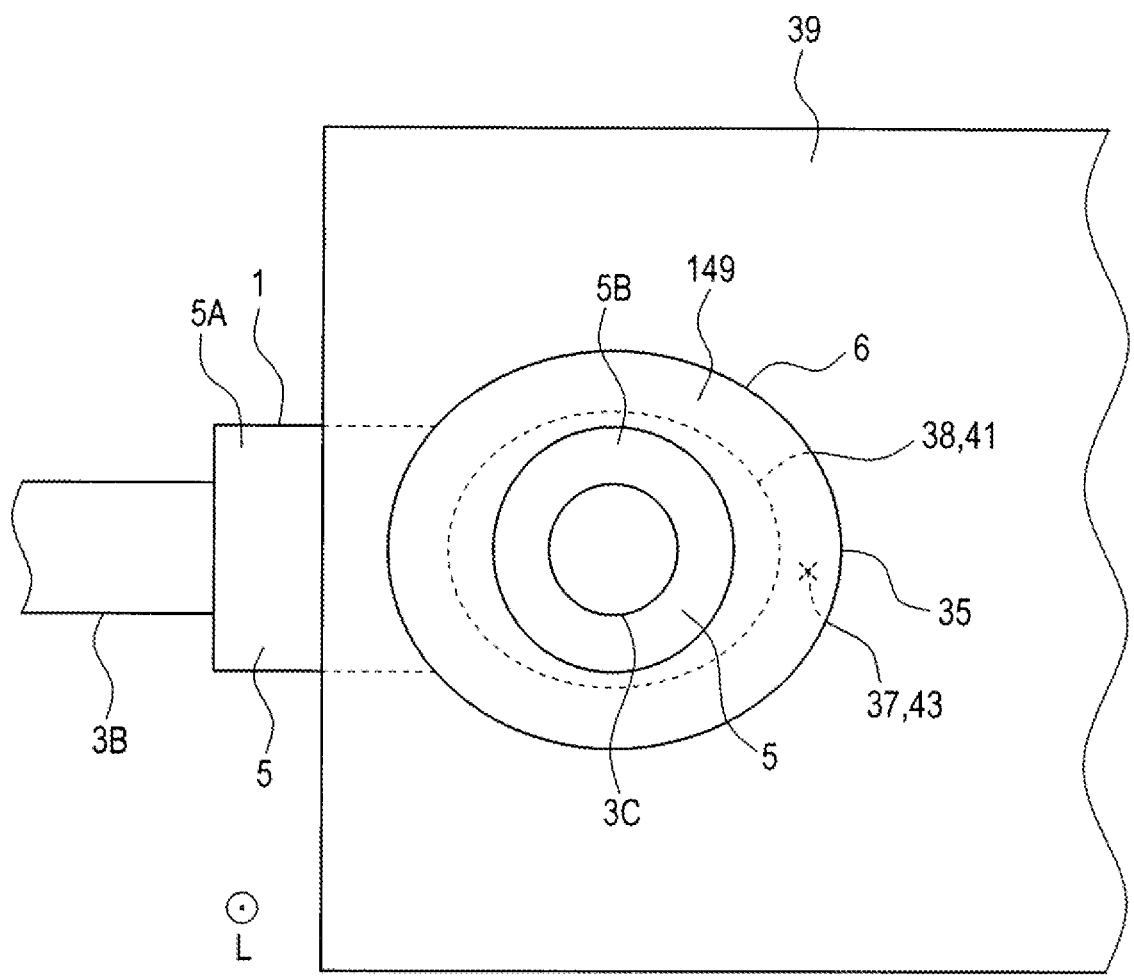
FIG. 4 is an explanatory view showing a structure of the wire harness 1 in the first embodiment seen from an end 5B.

The first protrusion 147, the second protrusion 149, and the groove 37 are formed entirely around the holding member 5, respectively. As shown in FIG. 4, each of both the outer circumferential edge 35 and a bottom 38 of the groove 37 has an elliptical shape when viewed in the longitudinal direction L. Each of the outer circumferential edge 35 and the bottom 38 may have an oval shape.

The grommet 6 has a function to fix the holding member 5 to a fixing target 39 shown in FIGS. 1 and 4. The fixing target 39 may be, for example, a part of a vehicle. In FIG. 1, for example, a portion above the fixing target 39 is inside the vehicle, and a portion below the fixing target 39 is outside the vehicle. The fixing target 39 is a plate-shaped member. The fixing target 39 has a fixing hole 41. As shown in FIG. 4, when viewed in a thickness direction of the fixing target 39, the fixing hole 41 has an elliptical or oval shape similar to the shape of the bottom 38. The fixing hole 41 has a slightly smaller internal diameter than the outer diameter of the bottom 38. The elliptical or oval shapes of the fixing hole 41 and the bottom 38 can inhibit rotation of the grommet 6 with respect to the fixing target 39.

As shown in FIG. 1, by press-fitting the grommet 6 into the fixing hole 41, the holding member 5 is fixed to the fixing target 39. An edge 43 of the fixing target 39 located around the fixing hole 41 is inserted to the groove 37 so as to push the bottom 38 in an inner circumferential direction. Since the grommet 6 comes into close contact with the edge 43, water is inhibited from entering the vehicle from the fixing hole 41.

Since the second protrusion 149 has a smaller outer diameter than the first protrusion 147, it is easy to press-fit the grommet 6 into the fixing hole 41 from the second protrusion 149 side. Since the outer circumferential edge 35 is tapered, it is easier to press-fit the grommet 6 into the fixing hole 41 from the second protrusion 149 side.

As shown in FIG. 1, the grommet 6 is provided on the outer circumference side of the straight portion 3C. Accordingly, the straight portion 3C is present on the inner circumference side of a portion of the holding member 5 where the grommet 6 is provided. The straight portion 3C comprises the outer sheath 11, as described above. Thus, the outer sheath 11 is present on the inner circumference side of the portion of the holding member 5 where the grommet 6 is provided. The grommet 6 may be made of the same material as the material of the holding member 5, for example.

The holding member 5 and the grommet 6 may be manufactured by a method below, for example. The cable 3 is set in a mold corresponding to the shapes of the holding member 5 and the grommet 6. At this time, the cable 3 has the shape in a finished product of the wire harness 1. Next, a liquid resin as the material of the holding member 5 and the grommet 6 is poured into the mold so as to form the holding member 5 and the grommet 6. This manufacturing method allows the holding member 5 and the outer sheath 11 to be easily welded.

2. Effects Achieved by Wire Harness 1

(1A) The wire harness 1 comprises the holding member 5, and thus can retain the shape of the bent portion 3A. Therefore, use of the wire harness 1 facilitates routing operation.

(1B) The bent portion 3A does not comprise the tape 9 and the outer sheath 11. Thus, the holding member 5 is in contact with the twisted wire 7 of the bent portion 3A. The holding member 5 enters the gaps 31 between the electric wires 13, 15, 17 which form the twisted wire 7. Each of the gaps 31 extends in a spiral direction, which does not match the longitudinal direction L. Therefore, the holding member 5 hardly moves relative to the cable 3 along the longitudinal direction L.

(1C) The electric wires 13, 15, 17 are twisted to form the twisted wire 7. Thus, at the bent portion 3A, strain applied to each of the electric wires 13, 15, 17 is reduced.

(1D) Both ends 5A, 5B of the holding member 5 in the longitudinal direction L are welded to the outer sheaths 11. Thus, moisture is inhibited from passing through a gap between the holding member 5 and the outer sheath 11 from outside and reaching an end 11A of the outer sheath 11 shown in FIG. 1. As a result, moisture is inhibited from entering a space between the outer sheath 11 and the twisted wire 7 from the end 11A side.

(1E) The wire harness 1 comprises the grommet 6. Thus, the wire harness 1 can be easily attached to the fixing target 39. The outer sheath 11 is present on the inner circumference side of the portion of the holding member 5 where the grommet 6 is provided. That is, the outer sheath 11 is present between the twisted wire 7 of the straight portion 3C and the grommet 6. Even when the edge 43 is pushed in the inner circumferential direction, the outer sheath 11 inhibits the edge 43 from damaging the twisted wire 7.

Second Embodiment

1. Differences from First Embodiment

The second embodiment basically has the same structure as the first embodiment. Therefore, differences from the first embodiment will be described hereinafter. The same reference numerals as those of the first embodiment are used to indicate the same components, and reference is made to the preceding description.

In the above-described first embodiment, the wire harness 1 comprises the grommet 6. The second embodiment is different from the first embodiment in that the wire harness 1 does not comprise the grommet 6, but comprises a fixing member 45 instead.

Figure 5:
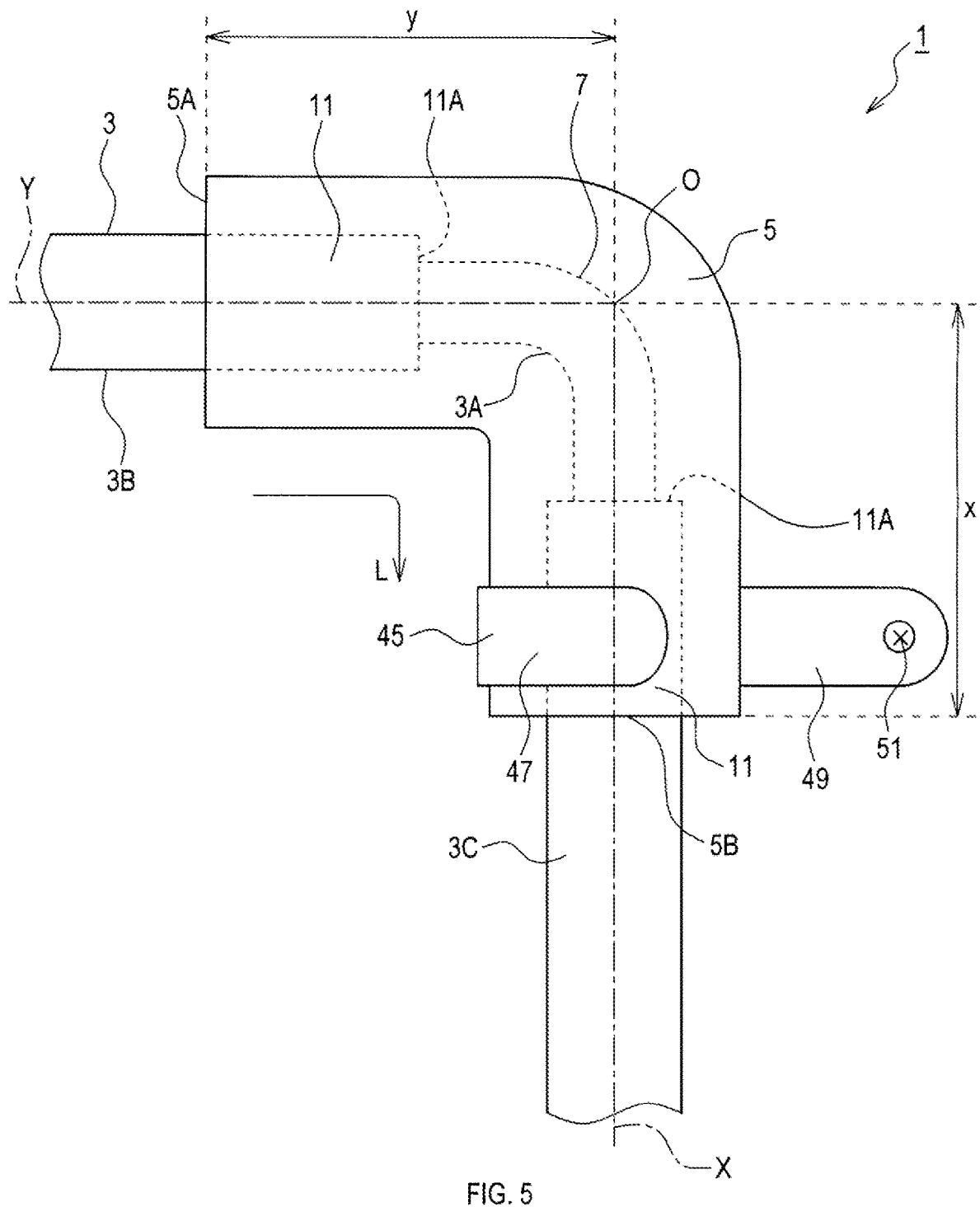
FIG. 5 is a plan view showing the structure of the wire harness 1 in a second embodiment.
Figure 6:
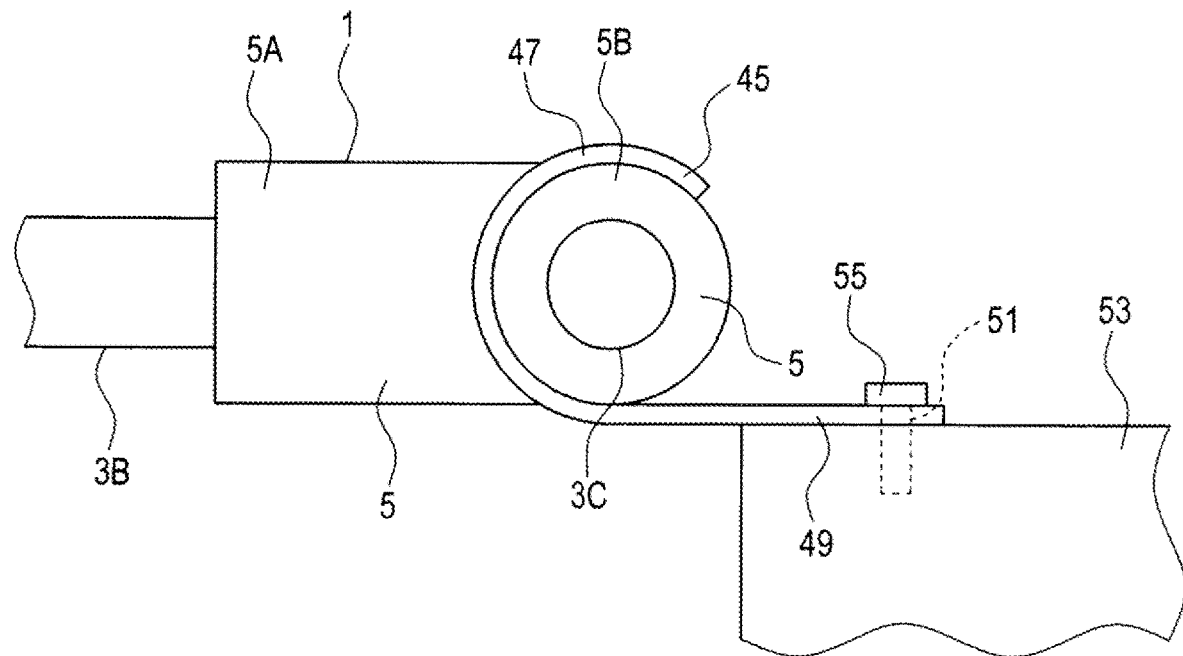
FIG. 6 is an explanatory view showing the structure of the wire harness 1 in the second embodiment seen from the end 5B.

As shown in FIGS. 5 and 6, the fixing member 45 is provided on the outer circumference side of the holding member 5. As shown in FIG. 5, the fixing member 45 is located on the end 5B side in the longitudinal direction L. The fixing member 45 is a band-shaped member made of a metal. The fixing member 45 comprises a first portion 47 wrapped around the outer circumference of the holding member 5, and a second portion 49 that extends away from the holding member 5 and extends straight.

The first portion 47 is fixed to the holding member 5, for example, by crimping. The second portion 49 has a fixing hole 51. As shown in FIG. 5, the first portion 47 is provided on the outer circumference side of the straight portion 3C. Therefore, the straight portion 3C is present on the inner circumference side of a portion of the holding member 5 where the first portion 47 is provided. The straight portion 3C, as described above, comprises the outer sheath 11. Therefore, the outer sheath 11 is present on the inner circumference side of a portion of the holding member 5 where the first portion 47 is provided.

The fixing member 45 has a function to fix the holding member 5 to a fixing target 53. The fixing target 53 is, for example, a part of a vehicle. As shown in FIG. 6, the second portion 49 comes into contact with a surface of the fixing target 53. A screw 55 passes through the fixing hole 51 and is screwed into the fixing target 53. As a result, the holding member 5 is fixed to the fixing target 53.

2. Effects Achieved by Wire Harness 1

According to the above detailed second embodiment, not only the aforementioned effects (1A) to (1D) of the first embodiment but also following effect are achieved.

(2A) The wire harness 1 comprises the fixing member 45. Therefore, the wire harness 1 can be easily fixed to the fixing target 53. Also, the outer sheath 11 is present on the inner circumference side of the portion of the holding member 5 where the first portion 47 is provided. That is, the outer sheath 11 is present between the twisted wire 7 of straight portion 3C and the first portion 47. Even when the first portion 47 is crimped, the outer sheath 11 inhibits the first portion 47 from damaging the twisted wire 7.

Third Embodiment

1. Differences from Second Embodiment

The third embodiment basically has the same structure as the second embodiment. Therefore, differences from the second embodiment will be described hereinafter. The same reference numerals as those of the second embodiment are used to indicate the same components, and reference is made to the preceding description.

In the above-described second embodiment, the wire harness 1 comprises the fixing member 45. The third embodiment is different from the second embodiment in that the wire harness 1 comprises a fixing member 57 shown in FIG. 7.

The fixing member 57 comprises a first portion 59 and a second portion 61. The first portion 59 is a band-shaped member made of a metal and bent into a U-shape. The second portion 61 is a flat band-shaped member made of a metal. The second portion 61 comprises insertion grooves 63, 65 and a fixing hole 51.

The fixing member 57 has a function to fix the holding member 5 to the fixing target 53. The second portion 61 comes into contact with the surface of the fixing target 53. The screw 55 passes through the fixing hole 51 and is screwed into the fixing target 53. As a result, the second portion 61 is fixed to the fixing target 53.

A portion of the holding member 5 on the end 5B side is placed on the second portion 61. Both ends 67, 69 of the first portion 59 are respectively inserted to the insertion grooves 63, 65. The holding member 5 is clamped and fixed by the first portion 59 and the second portion 61. As a result, the holding member 5 is fixed to the fixing target 53.

Figure 7:
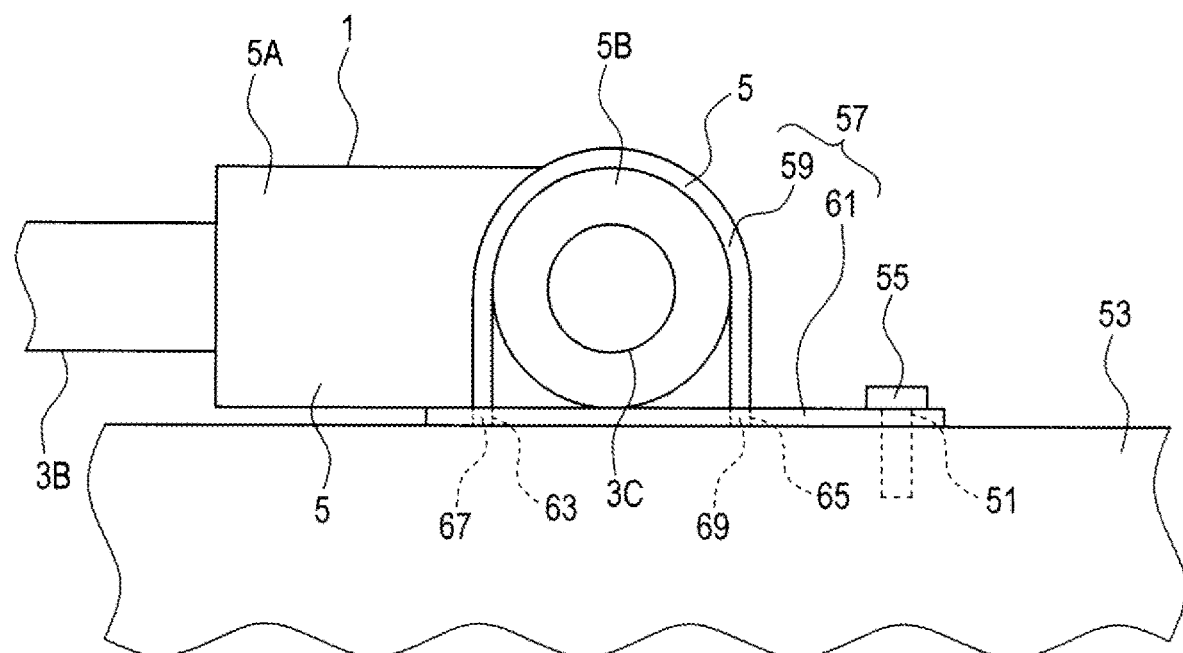
FIG. 7 is an explanatory view showing the structure of the wire harness 1 in a third embodiment seen from the end 5B.

As shown in FIG. 7, the fixing member 57 is provided on the outer circumference side of the straight portion 3C. Therefore, the straight portion 3C is present on the inner circumference side of a portion of the holding member 5 where the fixing member 57 is provided. The straight portion 3C, as described above, comprises the outer sheath 11. Therefore, the outer sheath 11 is present on the inner circumference side of a portion of the holding member 5 where the fixing member 57 is provided.

2. Effects Achieved by Wire Harness 1

According to the above-detailed third embodiment, not only the aforementioned effects (1A) to (1D) of the first embodiment but also following effect are achieved.

(3A) The wire harness 1 comprises the fixing member 57. Therefore, the wire harness 1 can be easily fixed to the fixing target 53. The outer sheath 11 is present on the inner circumference side of the portion of the holding member 5 where the fixing member 57 is provided. That is, the outer sheath 11 is present between the twisted wire 7 of the straight portion 3C and the fixing member 57. Even if the fixing member 57 strongly tightens the holding member 5, the outer sheath 11 inhibits the fixing member 57 from damaging the twisted wire 7.

Other Embodiments

The embodiments of the present disclosure are described hereinbefore. Nevertheless, the present disclosure is not limited to the above-described embodiments but may be embodied in various forms.

(1) In the first to third embodiments, one or both of the straight portions 3B, 3C may not comprise the outer sheath 11, and may each comprise a resin tube, instead. The resin tube corresponds to an insulation coating.

For example, in one or both of the straight portions 3B, 3C, the outer sheath 11 and the tape 9 may be removed, and then a resin tube may be inserted onto a portion of the outer circumference of the twisted wire 7 where the outer sheath 11 and the tape 9 are removed. The resin tube may be made, for example, of the same material as the material of the outer sheath 11. When the straight portions 3B, 3C do not comprise the outer sheath 11 but comprise the resin tubes instead, the holding member 5 covers the resin tubes.

Even when the straight portions 3B, 3C do not comprise the outer sheath 11 but comprise the resin tubes instead, the wire harness 1 achieves the same effects as in the case where the straight portions 3B, 3C comprise the outer sheaths 11.

(2) In the first to third embodiments, one or both of the straight portions 3B covered by the holding member 5 may not comprise the tape 9 and the outer sheath 11, like the bent portion 3A. A part of the bent portion 3A may comprise a tape 9 and an outer sheath 11. A part of the bent portion 3A may comprise a resin tube.

(3) In the first to third embodiments, the holding member 5 may cover only the bent portion 3A, and may not cover one or both of the straight portions 3B, 3C.

(4) In the first to third embodiments, the cable 3 may comprise a non-woven layer instead of the tape 9.

(5) In the first to third embodiments, the cable 3 may have an inclusion between the electric wires 13, 15, 17.

(6) In the first to third embodiments, the wire harness 1 may be adapted to other uses than the use for the vehicle.

(7) In the first embodiment, the wire harness 1 may not comprise the grommet 6. In the second embodiment, the wire harness 1 may not comprise the fixing member 45. In the third embodiment, the wire harness 1 may not comprise the fixing member 57.

(8) In the first to third embodiments, the twisted wire 7 may include other than three electric wires. The twisted wire 7 may include, for example, two, four, five, six, or more electric wires.

(9) The fixing member 45 in the second embodiment, and the fixing member 57 in the third embodiment may be made of materials other than metal. Such materials other than metal include, for example, resin, rubber, ceramic, etc.

The fixing member 45 may be fixed to the fixing target 53 by other methods. Such other methods include: inserting a protrusion provided in the second portion 49 into a hole provided in the fixing target 53; welding or gluing the second portion 49 and the fixing target 53; and sandwiching the second portion 49 between a pair of members, for example. The fixing member 57 may be fixed to the fixing target 53 in methods other than the above.

(10) A function of one component in the aforementioned embodiments may be distributed to two or more components or functions of two or more components may be achieved by one component. A part of the structures of the aforementioned embodiments may be omitted. At least a part of the structure of one of the aforementioned embodiments may be added to or replaced with the structure of another one of the aforementioned embodiments.

(11) In addition to the above-described wire harness, the present disclosure can be embodied in various forms, such as a system comprising the wire harness as a component, a method for manufacturing the wire harness, and a method for fixing the wire harness.

What is claimed is:

1. A wire harness comprising:
   a cable comprising a twisted wire comprising a pair or more of insulated coated wires twisted together, and an insulation coating that coats the twisted wire, the cable having a bent portion; and
   a holding member that covers a range of the cable including the bent portion, and retains a shape of the bent portion,
   wherein the twisted wire is in contact with the holding member at least in a part of the bent portion; and
   wherein at least a part of the holding member is welded to the insulation coating.

2. The wire harness according to claim 1, wherein both ends of the holding member in a longitudinal direction of the cable are welded to the insulation coating.

3. The wire harness according to claim 1, further comprising
   a grommet on an outer circumference side of the holding member, an edge of a fixing hole provided in a fixing target of the holding member being configured to be inserted to the grommet, wherein
   the insulation coating is present on an inner circumference side of a portion of the holding member where the grommet is provided.

4. The wire harness according to claim 2, further comprising:
   a grommet on an outer circumference side of the holding member, an edge of a fixing hole provided in a fixing target of the holding member being configured to be inserted to the grommet, wherein
   the insulation coating is present on an inner circumference side of a portion of the holding member where the grommet is provided.

* * * * *